(12) United States Patent
Walz (10) Patent No.: US 12,462,010 B2
(45) Date of Patent: Nov. 4, 2025

(54) LOCKING FUNCTION FOR A MOBILE DEVICE

(71) Applicant: HOYA CORPORATION, Tokyo (JP)

(72) Inventor: Michael Walz, Friedberg (DE)

(73) Assignee: HOYA CORPORATION, Tokyo (JP)

( * ) Notice: Subject to any disclaimer, the term of this patent is extended or adjusted under 35 U.S.C. 154(b) by 219 days.

(21) Appl. No.: 17/910,498

(22) PCT Filed: Mar. 2, 2021

(86) PCT No.: PCT/IB2021/051717
§ 371 (c)(1),
(2) Date: Sep. 9, 2022

(87) PCT Pub. No.: WO2021/181201
PCT Pub. Date: Sep. 16, 2021

(65) Prior Publication Data
US 2023/0222201 A1    Jul. 13, 2023

(30) Foreign Application Priority Data
Mar. 11, 2020    (DE) .................... 10 2020 106 631.7

(51) Int. Cl.
G06F 21/44    (2013.01)
A61B 1/00    (2006.01)
H04L 9/08    (2006.01)

(52) U.S. Cl.
CPC .......... *G06F 21/44* (2013.01); *A61B 1/00059* (2013.01); *H04L 9/0825* (2013.01); *H04L 9/0877* (2013.01)

(58) Field of Classification Search
CPC ... A61B 1/00059; G06F 21/44; G06F 21/445; G06F 21/83; G06F 2221/2103;
(Continued)

(56) References Cited

U.S. PATENT DOCUMENTS

| 10,764,752 B1 * | 9/2020 | Avetisov | H04L 63/0823 |
| 2009/0100502 A1 * | 4/2009 | Li | G06F 21/31 726/2 |

(Continued)

FOREIGN PATENT DOCUMENTS

| EP | 2283780 A2 | 2/2011 |
| EP | 3534371 A1 | 9/2019 |

(Continued)

OTHER PUBLICATIONS

Stanojevic, "How to disable driver signature enforcement on Windows 10" as posted at <https://windowsreport.com/driver-signature-enforcement-windows-10/> on Aug. 9, 2016. (Year: 2019).*

(Continued)

*Primary Examiner* — Scott B Christensen
(74) *Attorney, Agent, or Firm* — GREENBLUM & BERNSTEIN, P.L.C.

(57) ABSTRACT

A mobile device comprises a functional arrangement for performing a function of the mobile device, a coupling device for connecting the mobile device to a stationary device, an authentication device for authenticating the stationary device and an activation device. The authentication device authenticates the stationary device based on information on the stationary device. The activation device activates the functional arrangement when the mobile device is connected to the stationary device by the coupling device, and when the stationary device has been authenticated by the authentication device.

17 Claims, 7 Drawing Sheets

(58) Field of Classification Search
CPC ............. H04L 2209/80; H04L 2209/88; H04L 63/0869; H04L 9/0825; H04L 9/0877; H04L 9/3271; H04W 12/069; H04W 12/50

See application file for complete search history.

(56) References Cited

U.S. PATENT DOCUMENTS

| | | | |
|---|---|---|---|
| 2009/0276620 A1* | 11/2009 | McCarron | G06F 21/305 380/279 |
| 2011/0034910 A1 | 2/2011 | Ross et al. | |
| 2011/0246756 A1* | 10/2011 | Smith | H04L 9/32 713/170 |
| 2011/0277030 A1 | 11/2011 | Gillespie et al. | |
| 2013/0144797 A1* | 6/2013 | Bowles | G06Q 10/30 705/306 |
| 2013/0176104 A1* | 7/2013 | Rich | H04W 12/06 340/5.8 |
| 2015/0121455 A1* | 4/2015 | Siegel | H04L 63/08 726/2 |
| 2015/0134552 A1* | 5/2015 | Engels | G06Q 10/087 705/318 |
| 2015/0347744 A1 | 12/2015 | Kennedy et al. | |
| 2016/0117496 A1 | 4/2016 | Bielstein | |
| 2017/0327086 A1* | 11/2017 | Katou | G07C 9/00896 |
| 2018/0152454 A1* | 5/2018 | Kwon | H04L 63/045 |
| 2019/0012443 A1* | 1/2019 | Kwok-Suzuki | G06F 21/316 |
| 2019/0102533 A1 | 4/2019 | Sagar et al. | |
| 2019/0206563 A1 | 7/2019 | Shelton, IV et al. | |
| 2019/0266344 A1 | 8/2019 | Contolini et al. | |
| 2019/0332691 A1* | 10/2019 | Beadles | G06Q 20/3829 |
| 2019/0349755 A1* | 11/2019 | Maia | H04L 9/3226 |
| 2020/0193006 A1* | 6/2020 | Krieg | H04L 9/3236 |
| 2020/0412556 A1* | 12/2020 | Yoon | H04L 63/0876 |
| 2021/0093156 A1 | 4/2021 | Otsuka | |

FOREIGN PATENT DOCUMENTS

| | | |
|---|---|---|
| JP | 2002-345723 | 12/2002 |
| JP | 2019-213627 | 12/2016 |
| JP | 2019-111221 | 7/2019 |

OTHER PUBLICATIONS

Office Action issued in Japanese Patent Application No. 2022-553631, dated Sep. 5, 2023, together with an English translation.
International Search Report issued in International Patent Application No. PCT/IB2021/051717, dated May 11, 2021.

* cited by examiner

LOCKING FUNCTION FOR A MOBILE DEVICE

The present invention relates to a locking function for a mobile device, such as an endoscope.

Mobile devices, such as endoscopes, that are used for example in the medical field conventionally cooperate with many stationary devices. The stationary devices comprise processors, such as image or video processors, for example. Conventionally, an endoscope is not bound to a specific processor. Thus, an endoscope may be used with any processor from a compatible series.

The invention is based on the object of binding a mobile device to specific stationary devices.

This problem is solved by a further development of the mobile device and of a control method for a mobile device, as defined in the claims.

According to the invention, the mobile device may be operated such that it cooperates with specific stationary devices, but not, or not to its full functional scope, with other stationary devices different from these specific stationary devices.

According to an embodiment of the present invention, the proprietor, rightful owner or rightful user of the mobile device may specify the stationary devices with which the mobile device cooperates. This kind of locking function may e.g. render a stolen endoscope worthless.

According to an embodiment of the present invention, the stationary device has to authenticate itself to the mobile device.

Embodiments of the invention with reference to the enclosed drawings will be described in the following.

In the following, embodiments of the invention will be described with reference to the drawings.

Figure 1:
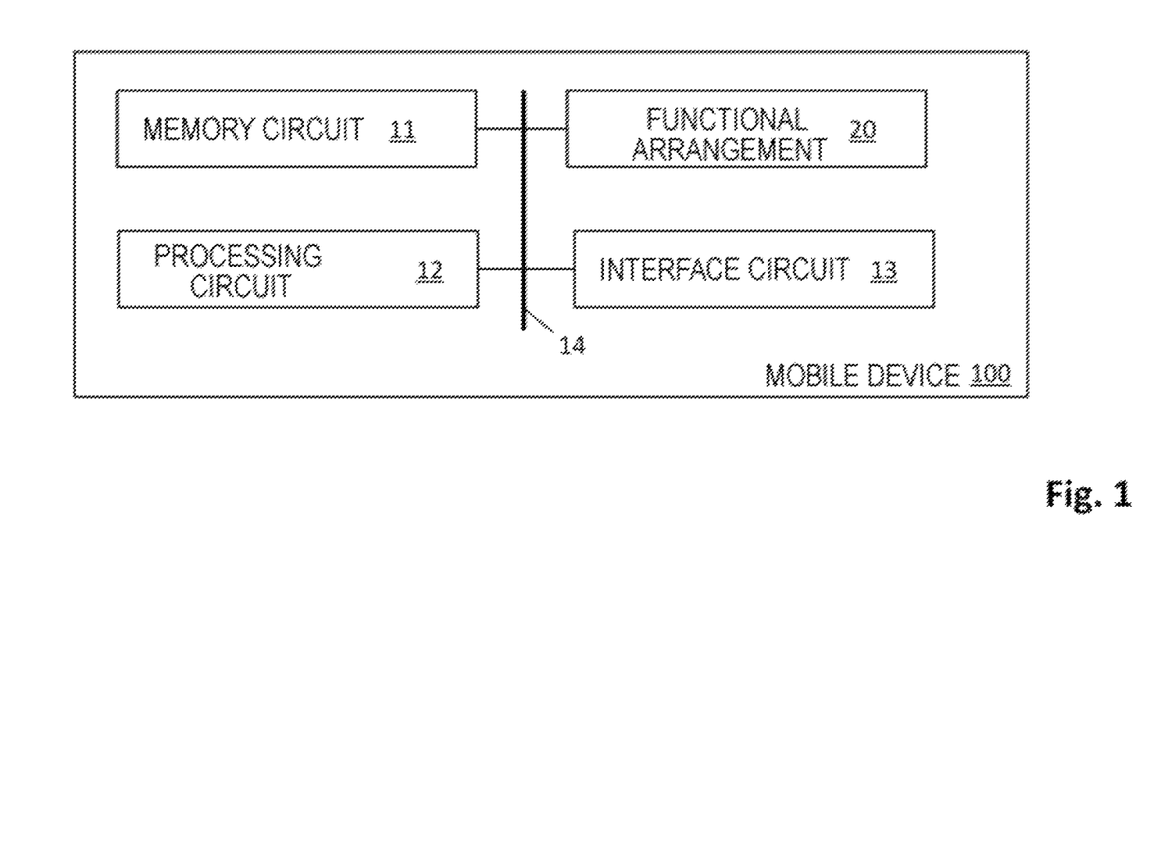
FIG. 1 shows a schematic representation of a structure of a mobile device in which the embodiments of the invention can be implemented.

FIG. 1 shows a schematic representation of a construction of a mobile device 100 in which at least some embodiments of the invention can be implemented.

The mobile device 100 comprises a functional arrangement 20, a memory circuit 11, a processing circuit 12 and an interface circuit 13, which can communicate with each other via a bus 14, for example.

According to an embodiment, the functional arrangement 20 comprises one or several basic functions of the mobile device 100. For instance, the basic functions comprise functions of a conventional endoscope.

The memory circuit 21 comprises, for example, a read only memory (ROM), a random access memory (RAM), an erasable read-only memory (erasable programmable ROM, EPROM), an electrically erasable read only memory (electrically erasable programmable ROM, EEPROM), or a flash EEPROM.

According to an implementing example of the present invention, the memory circuit 11 stores a program carried out by the processing circuit 12, and data required for the processing circuit 12 carrying out the program.

According to an embodiment of the present invention, the memory circuit 11 stores information about a plurality of stationary devices, identifications of the plurality of stationary devices or keys of the plurality of stationary devices, which will be described in greater detail below.

According to an embodiment of the present invention, the memory circuit 11 also stores authentication information on users of the mobile device 100.

The interface circuit 13 connects the mobile device 100 to a stationary device, for example. According to an embodiment of the present invention, the interface circuit 13 is also used as a user interface.

Figure 2:
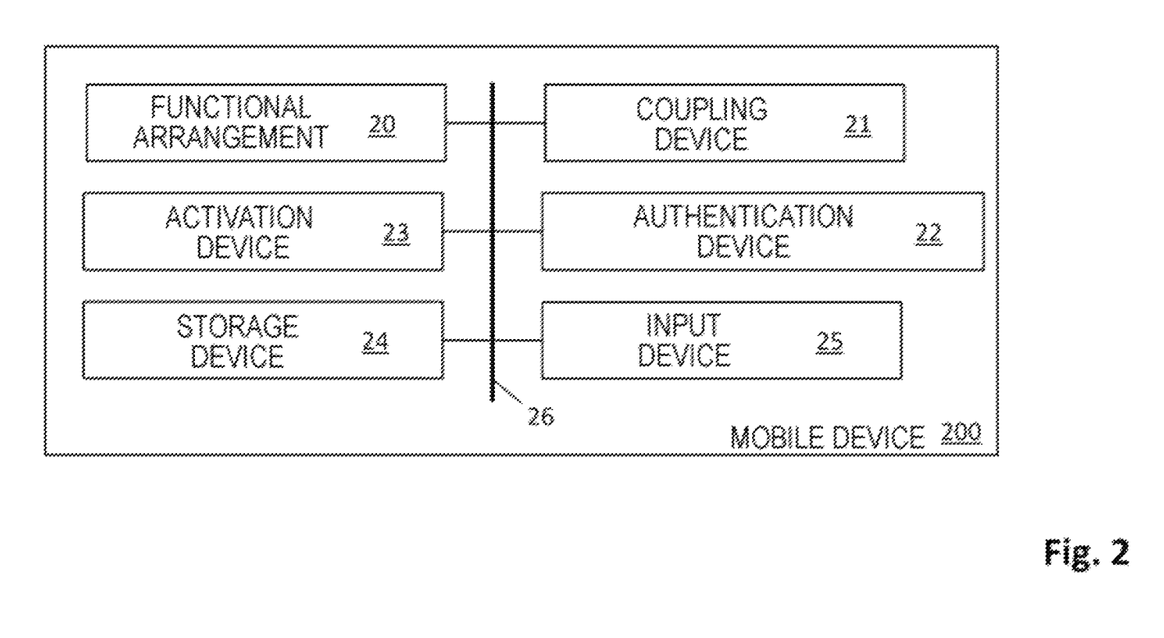
FIG. 2 shows a schematic representation of a functional structure of a mobile device according to an embodiment of the invention.

FIG. 2 shows a schematic representation of a functional structure of a mobile device 200 according to an embodiment of the invention.

The mobile device 200 comprises the functional arrangement 20 as described above, a coupling device 21, an authentication device 22 and an activation device 23 adapted to communicate with each other via a bus 26, for example. Optionally, the mobile device 200 further comprises a storage device 24 and an input device 25, which are also connected to the bus 26, for example.

According to an embodiment of the invention, the functions of the coupling device 21 are further developed by the interface circuit 13. According to an embodiment of the invention, the functions of the authentication device 22 and of the activation device are further developed by the processing circuit 12 in combination with the memory circuit 11, for example.

According to an embodiment of the invention, the functions of the storage device 24 by the memory circuit 11 and the functions of the input device 25 by the interface circuit 13 are further developed by the interface circuit 13 and, optionally, also the processing circuit 12.

The coupling device 21 is used for connecting the mobile device 200 to at least one stationary device. The stationary device comprises a processor, for example, such as an image or video processor.

The authentication device 22 is used for the authentication of the stationary device, based on information about the stationary device which is stored in advance in the storage device 24, for example.

According to an embodiment of the invention, the activation device 23 activates the functional arrangement 20 when the mobile device 200 is connected to the stationary device by the coupling device 21, and when the stationary device has been authenticated by the authentication device 22.

According to an embodiment, the functional arrangement 20 comprises "critical" functions of the mobile device 100, whereas "non-critical" functions of the mobile device 100 are not comprised by the functional arrangement 20. This means that the "non-critical" functions are available without the stationary device having to be authenticated by the authentication device 22. The critical functions may be switched on by a correct authentication of the stationary device by the authentication device 22 via the activation device 23.

According to an embodiment of the invention, the input device 25 is used for the activation or deactivation of the authentication device 22, in other words, the locking function of the mobile device 200, for example by the proprietor or a rightful owner or user of the mobile device 200.

When the authentication device 22 is not activated by the input device 25, the activation device 23 can activate the functional arrangement 20 if the mobile device 200 is connected to the stationary device by the coupling device 21 without the authentication device carrying out an authentication of the stationary device. In other words, according to this embodiment of the invention, the locking function for the mobile device 200 can be switched on and off.

According to an embodiment of the invention, the input device 25 is further used to input or change information, identifications or keys stored in the storage device 24.

According to an embodiment of the invention, the input device 25 further authenticates a proprietor or rightful owner or user and activates the authentication device 22, i.e. the locking function, only when the input device 25 has authenticated the proprietor or rightful owner or user. This means that only an authenticated user may switch the locking function on and off by means of the input device 25. The input device 25 can access the storage device 24 without the authentication device 22 being involved.

According to another embodiment of the invention, it is not the input device 25 but the authentication device 22 that carries out the authentication of the user who inputs information regarding his authentication via the input device 25. In this case, the input device 25 accesses the storage device 24 via the authentication device 22.

According to an embodiment of the invention, only the authenticated user is actually qualified to input or change the information, identifications or keys stored in the storage device 24 via the input device 25.

According to an embodiment of the invention, the authentication device 22 authenticates the stationary device when an identification of the stationary device corresponds to at least one identification of a stationary device which is stored in the storage device 24, for example.

When the mobile device 200 is connected to the stationary device, the authentication device 22 procures, according to an embodiment of the invention, the identification of the stationary device and compares the procured identification with identifications stored in the storage device 24, for example. If the procured identification is not among the stored identifications, the functional arrangement 20 is not activated. If the procured identification is among the stored identifications, the functional arrangement 20 is activated.

The authentication device 22 procures the identification of the stationary device, e.g. by reading out the identification of the stationary device from the stationary device via the coupling device 21.

The identifications are unique for every stationary device. When the locking function is activated, the mobile device only works in combination with a stationary device which has an identification known to the mobile device 200.

Figure 3:
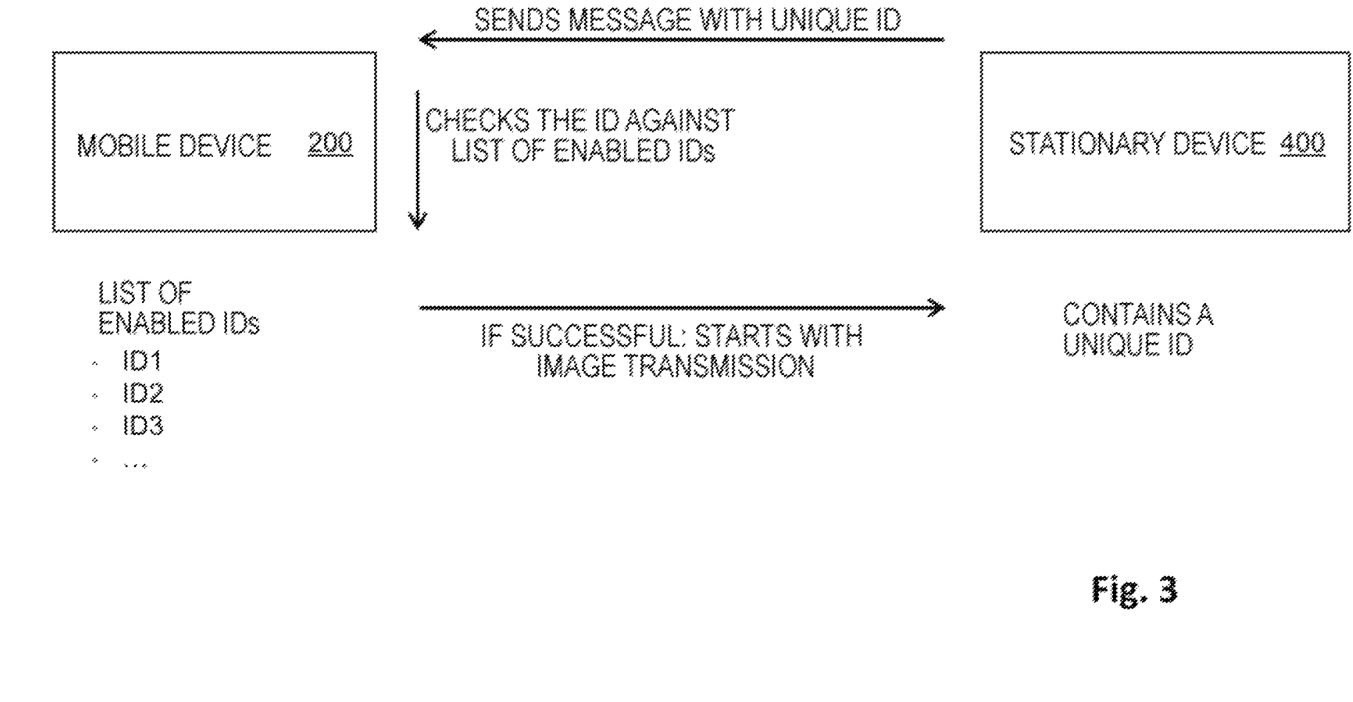
FIG. 3 shows a schematic representation illustrating an embodiment of an authentication of a stationary device by a mobile device.

FIG. 3 shows a schematic representation that illustrates an embodiment of an authentication of a stationary device 400 by the above-described mobile device 200.

As shown in FIG. 3, the authentication device 22 procures the identification of the stationary device in that the mobile device 200 receives a message with a unique identification of the stationary device from the stationary device 400.

Thereupon, the mobile device 200 compares the received identification with a list of enabled identifications ID1, ID2, ID3, etc., which are stored in the storage device, for example. If the identification received corresponds to one of the identifications enabled, the mobile device 200 starts the image transmission which, in this case, constitutes one of the critical functions. This means that the activation device 23 activates the functional arrangement 20 required for the image transmission.

According to an embodiment of the invention, a cryptographic method is applied for the authentication of stationary devices.

Figure 4:
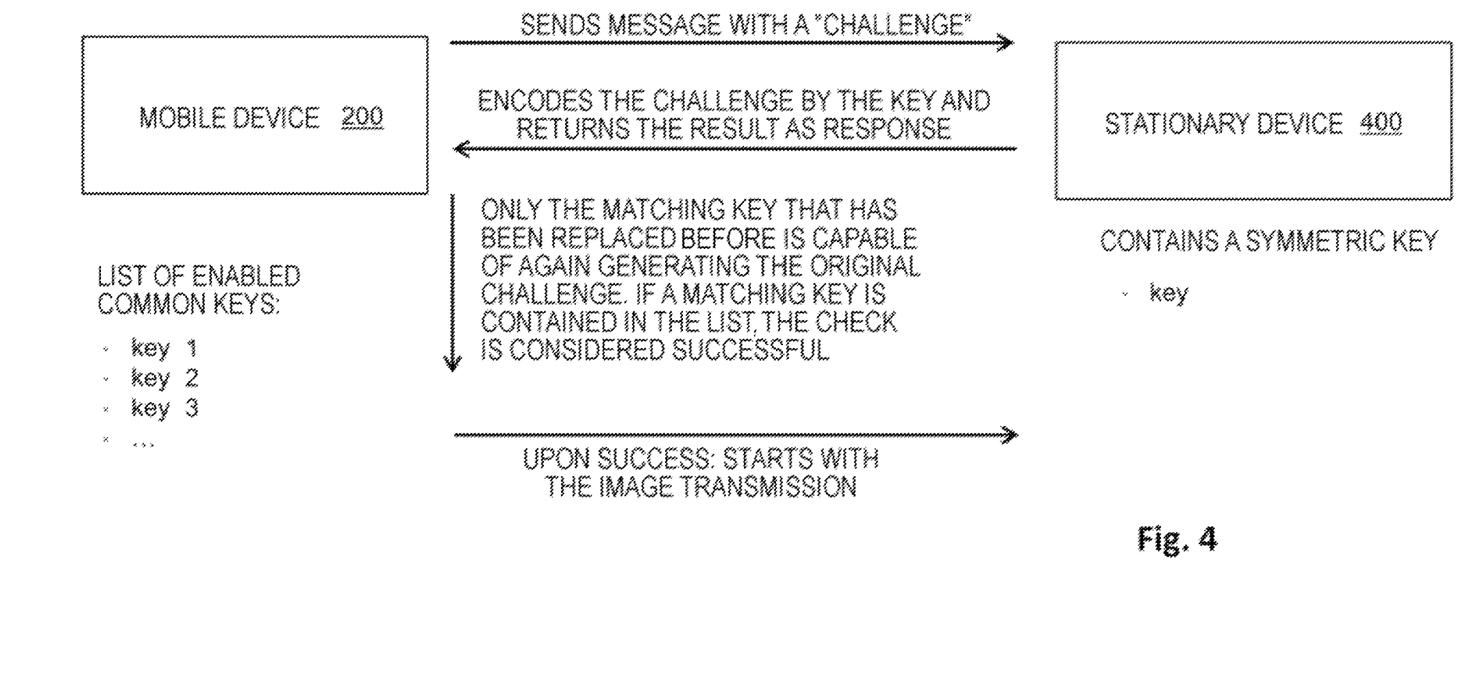
FIG. 4 shows a schematic representation illustrating a further embodiment of an authentication of the stationary device by the mobile device.

FIG. 4 shows a schematic representation which illustrates a further embodiment of an authentication of the stationary device 400 by the above-described mobile device 200. For this embodiment of the invention, the authentication is carried out by symmetrical cryptography. In advance, a key of the stationary device 400 is exchanged with the mobile device 200 or the place at which a list of the enabled common keys key 1, key 2, key 3, etc., is stored. For instance, the mobile device 200 stores the key of the stationary device in the storage device 24, for example, instead of the identification or additionally to the identification of the stationary device 400.

As shown in FIG. 4, the mobile device 200 (e.g. the authentication device 22) sends, when the stationary device 400 is authenticated, a message with a "challenge" via the coupling device 21 to the stationary device 400. The "challenge" is, for example, a data package generated at random.

The stationary device 400 encodes the challenge by the key, and sends the result as response back to the mobile device 200, which receives this response via the coupling device 21.

The mobile device 200 (e.g. the authentication device 22) now attempts to decode the received response by using the enabled common keys. Only the matching key that has been exchanged before (e.g. key 1, key 2, key 3, etc.) is capable of again generating the original challenge from the response. When a matching key is contained in the list, the mobile device 200 starts the image transmission which, in this case, constitutes one of the critical functions. This means that the activation device 23 activates the functional arrangement 20 required for the image transmission.

For the application of an asymmetric cryptography for the authentication, each stationary device contains a public key and a private key, e.g. an asymmetric pair of keys. A message encoded by the private key may only be decoded by the public key of the asymmetric pair of keys. The private key and the public key are obtained by a method according to RSA, for example.

For instance, the mobile device 200 stores, instead of an identification of the stationary device, the public key of the stationary device, e.g. in the storage device 24. According to an embodiment of the invention, this cryptographic method is supported by hardware, the authentication device comprising a Trusted Platform Module (TPM).

Figure 5:
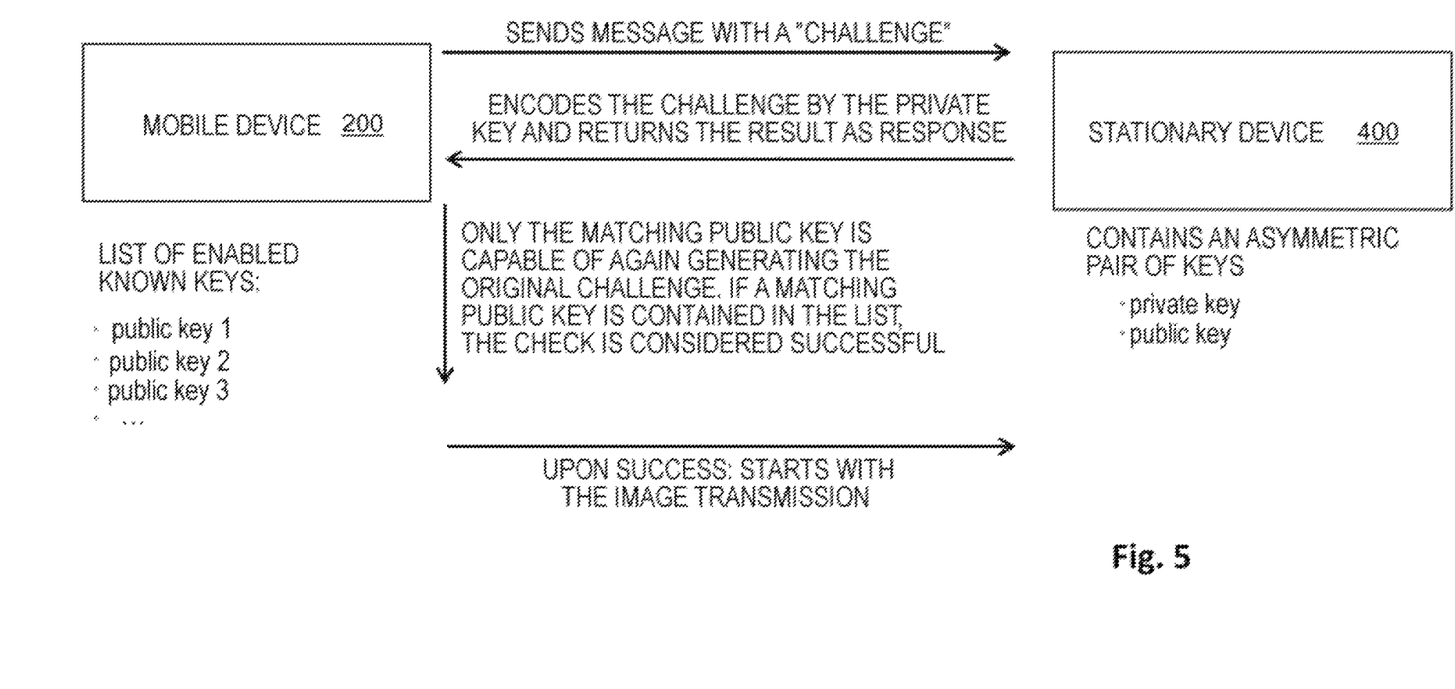
FIG. 5 shows a schematic representation illustrating a further embodiment of an authentication of the stationary device by the mobile device.

FIG. 5 shows a schematic representation illustrating a further embodiment of an authentication of the stationary device 400 by the above-described mobile device 200. In this embodiment of the invention, the authentication is performed by asymmetric cryptography. The stationary device 400 contains an asymmetric pair of keys "private key" and "public key". The "public key" of the stationary device 400 has been provided to the mobile device 200 or the place at which a list of enabled known keys public key 1, public key 2, public key 3, etc., is stored.

If the mobile device 200 is coupled to the stationary device 400, the authentication device 22 transmits a message with a "challenge" via the coupling device 21 to the stationary device 400. For example, the "challenge" is a data package generated at random.

The stationary device 400 encodes the challenge by the private key, and sends the result as response back to the mobile device 200 (the authentication device 22), which receives said response via the coupling device 21.

The mobile device 200 (e.g. the authentication device 22) now attempts to decode the received response by using the known enabled keys. Only the matching public key (e.g. public key 1, public key 2, public key 3, etc.) is capable of again generating the original challenge from the response. If a matching public key is contained in the list, the mobile device 200 starts the image transmission, which constitutes one of the critical functions in this case. This means that the activation device 23 activates the functional arrangement 20 required for the image transmission.

According to an embodiment of the invention, the mobile device 200 stores the identification of the stationary device as well as the key or public key of the stationary device. This is advantageous if the mobile device 200 is configured to cooperate with several stationary devices. When the mobile device 200 is being connected to the stationary device, the authentication device 22 procures the identification of the stationary device and compares the identification procured with identifications that are stored in the storage device 24, for example. If the procured identification is not among the stored identifications, the functional arrangement 20 is not activated.

If the procured identification is among the stored identifications, the authentication device 22 sends a message with a challenge as shown in FIG. 4 or FIG. 5 to the stationary device 400, and authenticates the stationary device 400 when the authentication device 22 can decode the response from the stationary device 400, which is encoded by the key or the private key of the stationary device, by the key or the public key of the stationary device 400, so that the original challenge is generated.

Figure 6:
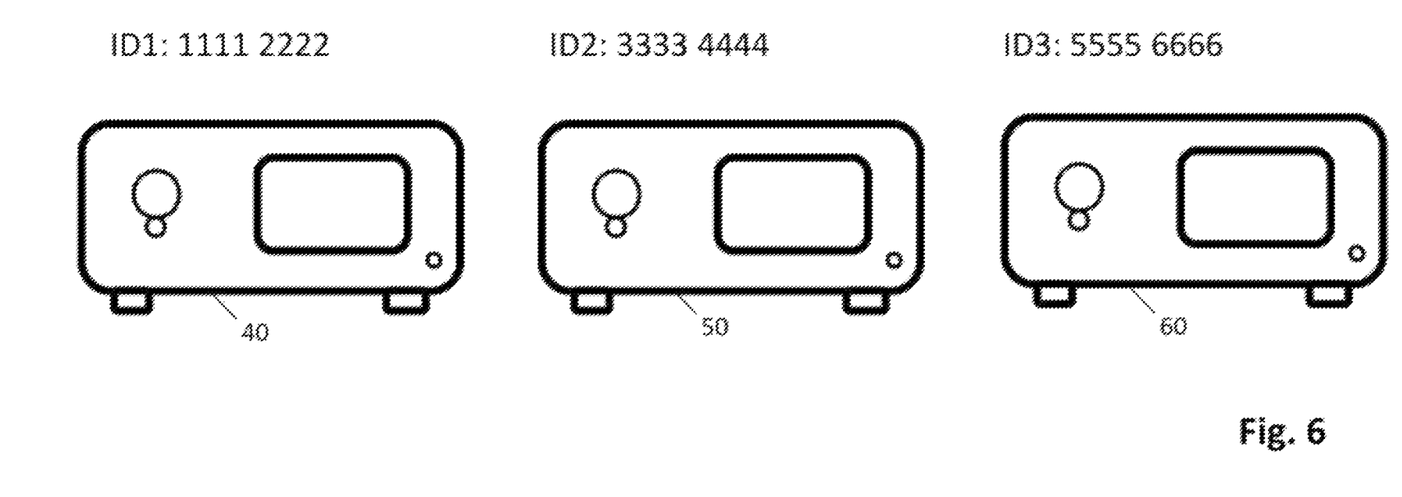
FIG. 6 illustrates IDs of stationary devices.

FIG. 6 illustrates IDs as examples of identifications of processors which are examples of stationary devices with which an endoscope constituting an example of the mobile device 200 may cooperate. A processor 40 has an ID 1111 2222, a processor 50 has an ID 3333 4444, and a processor 60 has an ID 5555 6666.

Figure 7:
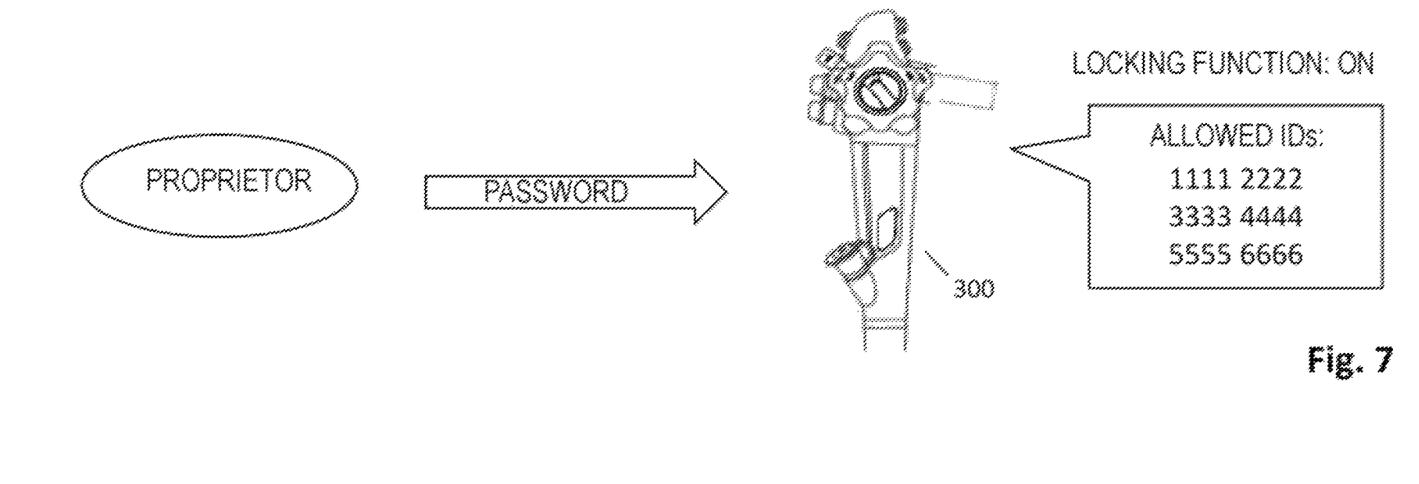
FIG. 7 illustrates a procedure for the activation of an authentication of stationary devices according to an embodiment of the invention.

FIG. 7 illustrates a procedure for the activation of an authentication of stationary devices according to an embodiment of the invention.

In this procedure, the proprietor of an endoscope 300, which constitutes an example of the mobile device 200, stores allowed IDs, i.e. IDs of processors with which the endoscope 300 may cooperate, in the endoscope 300, for example in the storage device 24. For this purpose, the proprietor has to authenticate himself to the endoscope 300, which he does via the input device 25, for example, as has been described above. This authentication comprises, for example, the input of a password by means of the input device 25.

The authenticated proprietor may also switch the locking function of the endoscope 300 on and off. In the example shown in FIG. 7, the locking function of the endoscope 300 is switched on, and IDs 1111 2222, 3333 4444 and 5555 6666 of processors 40, 50, 60, with which the endoscope 300 may cooperate, are stored in the endoscope 300.

Figure 8:
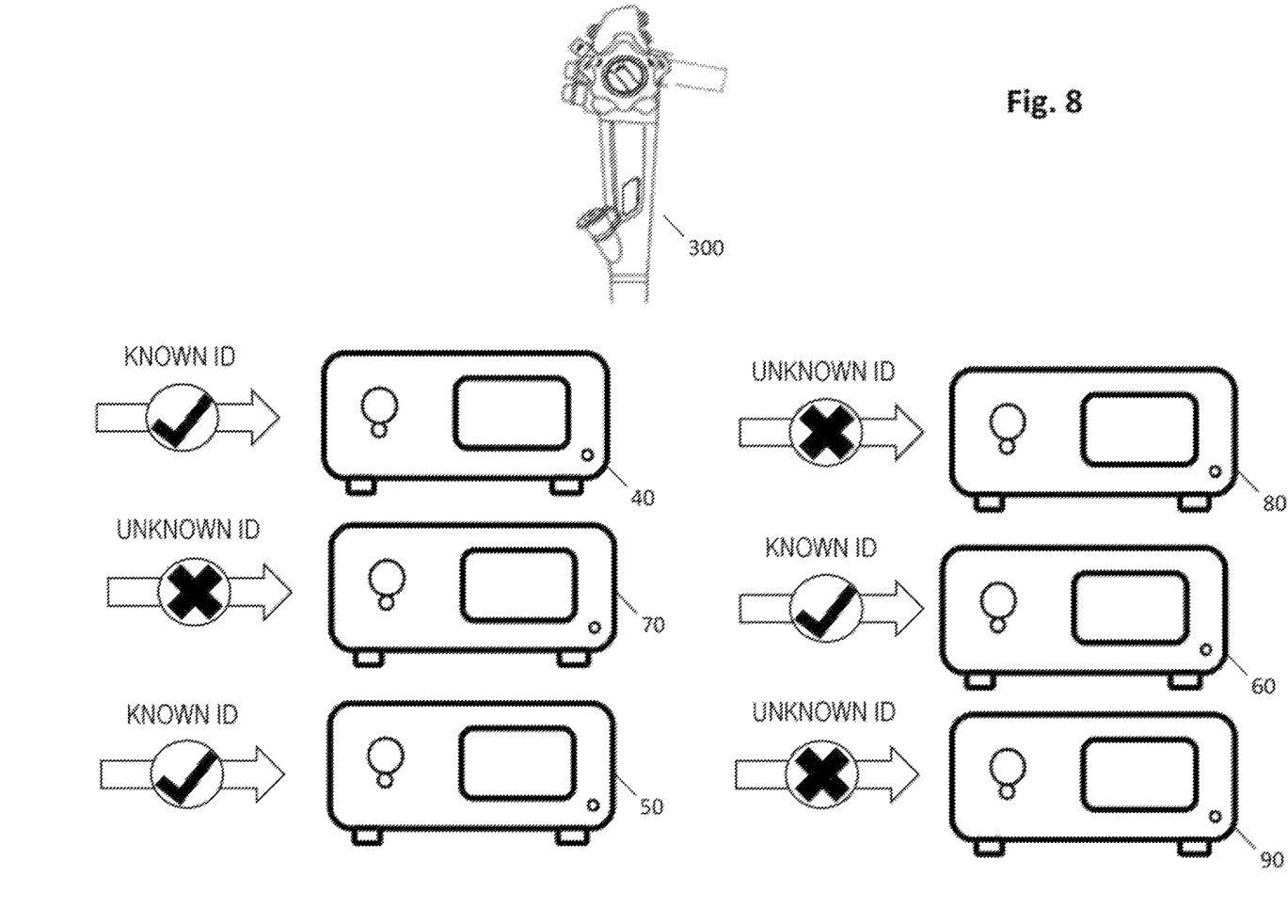
FIG. 8 illustrates an authentication of stationary devices according to an embodiment of the invention.

FIG. 8 illustrates the result of an authentication of stationary devices according to an embodiment of the invention.

If the endoscope 300 is connected to one of the processors 40, 50 or 60, whose IDs 1111 2222, 3333 4444 or 5555 6666 are known to the endoscope 300, whose locking function is switched on, the endoscope 300 cooperates with the processor 40, 50 or 60. This means that, when the processor 40, 50 or 60 has authenticated itself to the endoscope 300, the activation device 23 activates the functional arrangement 20.

On the other hand, if the endoscope 300 is connected to one of the processors 70, 80 or 90 whose IDs are not known to the endoscope 300, whose locking function is switched on, the endoscope 300 does not cooperate with the processor 70, 80 or 90. This means that, if the processor 70, 80 or 90 could not authenticate itself to the endoscope 300, the activation device 23 does not activate the functional arrangement 20.

It is noted that the invention is not restricted to the above-described embodiments. The scope of protection of the invention is defined by the claims enclosed.

The invention claimed is:

1. An endoscope comprising
a medical device controller for performing a function of the endoscope;
a coupler for physically connecting and disconnecting the endoscope with at least one medical device processor;
an authenticator for authenticating the at least one medical device processor based on information on the at least one medical device processor;
an actuator for activating the medical device controller when the endoscope is connected to the at least one medical device processor by the coupler, and when the at least one medical device processor has been authenticated by the authenticator; and
an input for selectively deactivating and activating the authenticator in accordance with a user's input, such that that actuator:
upon deactivation of the authenticator by the input, activates without authentication the medical device controller when the endoscope is physically connected to the at least one medical device processor by the coupler such that only non-critical functions of the endoscope are available, and
upon activation of the authenticator by the input, activates the medical device controller when the endoscope is physically connected to the at least one medical device processor by the coupler and only when the at least one medical device processor has been authenticated by the authenticator such that both critical and the non-critical functions of the endoscope are available.

2. The endoscope according to claim 1, wherein the authenticator is configured to authenticate the at least one medical device processor when an identification of the at least one medical device processor corresponds to at least one identification of a said medical device processor.

3. The endoscope according to claim 1, wherein the authenticator is configured to
send a first message to the at least one medical device processor,
receive an encoded second message from the at least one medical device processor and decode the encoded second message using a key from a list of keys of medical device processors, and authenticate the at least one medical device processor when the decoding of the encoded second message by the key results in the first message.

4. The endoscope according to claim 3, wherein the key is a common key.

5. The endoscope according to claim 3, wherein the key is a public key of an asymmetric pair of keys.

6. The endoscope according to claim 1, wherein the authenticator is configured to authenticate the at least one medical device processor when the at least one medical device processor is connected to the endoscope by the coupler.

7. The endoscope according to claim 1, further comprising a storage for storing information on a plurality of medical device processors, identifications of the plurality of medical device processors or keys of the plurality of medical device processors.

8. The endoscope according to claim 7, wherein the input is configured to input or change the information, identifications or keys stored in the storage.

9. The endoscope according to claim 8, wherein the input is configured to authenticate the user and to activate the authenticator for at least one of:
 authenticating the at least one medical device processor; and
 for inputting or changing the information, identifications or keys stored in the storage when the input has authenticated the user.

10. The medical device endoscope according to claim 8, wherein the authenticator is configured to authenticate the user via the input and to activate the authenticator for at least one of:
 authenticating the at least one medical device processor; and
 for inputting or changing the information, identifications or keys stored in the storage when the authenticator has authenticated the user.

11. The endoscope according to claim 1, wherein the actuator is configured to block the medical device controller when the authenticator is activated and the authenticator does not authenticate the medical device processor.

12. The endoscope according to claim 5, wherein
 the function of the medical device is an image-transmitting function, and/or
 the authenticator comprises a Trusted Platform Module.

13. The endoscope according to claim 1, wherein:
 the critical functions include endoscopic image transmission, and
 the non-critical functions include functions other than endoscopic image transmission and functions other than functions provided by the medical device controller.

14. A control method for an endoscope comprising a medical device controller for performing a function of the endoscope, a coupler for connecting and disconnecting the endoscope with at least one medical device processor, an authenticator for authenticating the at least one medical device processor, and an input for selectively deactivating and activating the authenticator in accordance with a user's input, the control method comprising:
 authenticating the at least one medical device processor by the authenticator based on information on the at least one medical device processor;
 activating the medical device controller when the endoscope is connected to the at least one medical device processor by the coupler, and when the at least one medical device processor has been authenticated; and
 upon deactivation of the authenticator by the input, activating without authentication the medical device controller when the endoscope is connected to the at least one medical device processor by the coupler such that only non-critical functions of the endoscope are available, and
 upon activation of the authenticator by the input, activating the medical device controller when the endoscope is connected to the at least one medical device processor by the coupler and only when the at least one medical device processor has been authenticated by the authenticator such that both critical and the non-critical functions of the endoscope are available.

15. The endoscope according to claim 1, wherein:
 the medical device controller is an endoscope controller, and
 the at least one medical device processor is at least one endoscope processor.

16. The control method according to claim 14, wherein:
 the medical device controller is an endoscope controller, and
 the at least one medical device processor is at least one endoscope processor.

17. The control method according to claim 14, wherein:
 the critical functions include endoscopic image transmission, and
 the non-critical functions include functions other than endoscopic image transmission and functions other than functions provided by the medical device controller.

* * * * *